(12) United States Patent
Lin

(10) Patent No.: US 8,422,829 B2
(45) Date of Patent: Apr. 16, 2013

(54) INTERPOLATION METHOD AND INTERPOLATION CIRCUIT

(75) Inventor: Teng-Yi Lin, Kaohsiung County (TW)

(73) Assignee: Novatek Microelectronics Corp., Hsinchu (TW)

( * ) Notice: Subject to any disclaimer, the term of this patent is extended or adjusted under 35 U.S.C. 154(b) by 980 days.

(21) Appl. No.: 12/482,447

(22) Filed: Jun. 10, 2009

(65) Prior Publication Data

US 2010/0260434 A1 Oct. 14, 2010

(30) Foreign Application Priority Data

Apr. 14, 2009 (TW) ................................ 98112358 A

(51) Int. Cl.
*G06K 9/32* (2006.01)
*G06K 9/40* (2006.01)

(52) U.S. Cl.
USPC .......................................... 382/300; 382/266

(58) Field of Classification Search .................. 382/300, 382/266, 276, 298, 299; 358/428, 525
See application file for complete search history.

(56) References Cited

U.S. PATENT DOCUMENTS 7,167,602 B2 * 1/2007 Yamashita et al. ............ 382/300
7,843,509 B2 * 11/2010 Hahn et al. .................... 348/448

* cited by examiner

*Primary Examiner* — Yon Couso
(74) *Attorney, Agent, or Firm* — Jianq Chyun IP Office

(57) ABSTRACT

An interpolation method and an interpolation circuit are provided. The interpolation method calculates a difference between values of a first point and a second point and calculates an absolute value of the difference. Then, the absolute value of the difference is used to mix a first function and a second function to obtain a transformation function, which is then used to calculate an interpolation value of an interpolation point between the first point and the second point. Accordingly, the present invention may obtain a result close to high order interpolation without increasing hardware expense.

14 Claims, 4 Drawing Sheets

INTERPOLATION METHOD AND INTERPOLATION CIRCUIT

CROSS-REFERENCE TO RELATED APPLICATION

This application claims the priority benefit of Taiwan application serial no. 98112358, filed on Apr. 14, 2009. The entirety of the above-mentioned patent application is hereby incorporated by reference herein and made a part of specification.

BACKGROUND OF THE INVENTION

1. Field of the Invention

The present invention is related to an interpolation method and an interpolation circuit, and more particularly, to a method and a circuit for mixing a linear function and a sinusoidal function to perform interpolation.

2. Description of Related Art

Along with the high development of video image technique, digital cameras and digital camcorders have become one of the indispensable tools in the daily life. These devices may be built with various image processing functions or provide corresponding image processing software, so as to enable a user to magnify the image when taking the image, or browse or process the image after taking the image.

When the user needs to take a magnified image of a person or an object, he/she may use the built-in digital zoom function of the device to magnify the image and then take the shot. When the user needs to browse the detail of the captured image after taking the shot, he/she may use an image magnifying function of the image processing software associated with or accompanied by the camera, so as to get a clearer image.

However, when using the digital cameras in the market to perform a digital zoom in function, edges with sawtooth are often occurred. Similar image distortion may also occur when using image processing software to perform the image zoom in processing. That is because a linear interpolation method or a nearest point interpolation method is used for calculating the interpolation values between each two pixels in an original image and using the same as pixel values of newly added pixels after the image is magnified when performing the image zoom in process.

For example, FIG. 1 is a schematic diagram illustrating a conventional linear interpolation method of two points. Referring to FIG. 1, A and B are two adjacent pixels in the original image and are located in coordinates of 0 and 1, respectively. Y is the point to be interpolated for, which is located between coordinates 0 and 1 and has a distance x from the coordinate 0, wherein $0 \leq x < 1$. The interpolation value Y can be obtained through an interpolation formula as shown below:

$$Y = (1-x) \times A + x \times B \quad (1)$$

However, although the calculation of the conventional linear interpolation method is simpler and the required hardware cost is lower, the calculated image qualify is worse, especially for the high frequency portion of the image. The image quality is usually unacceptable by the user. On the other hand, to use a higher order interpolation method to calculate the interpolation values, pixel values of more pixels are required to be referenced. Meanwhile, the size of disposition for the liner buffer should be increased so as to store pixel values of more horizontal lines. As a result, the cost of the hardware is increased.

SUMMARY OF THE INVENTION

The present invention provides an interpolation method, in which original linear interpolation coefficients are mapped to a high order transformation function, and used to calculate interpolation values, so as to obtain a result close to high order interpolation.

The present invention provides an interpolation circuit, in which an absolute value of a difference between two points is used to determine a mixing weight of a linear function and a sinusoidal function, so as to obtain a transformation function for calculating interpolation values.

The present invention provides an interpolation method, suitable for calculating an interpolation value of an interpolation point between two points. In the present method, a difference between values of a first point and a second point is calculated first, and then an absolute value of the difference is calculated. Next, a first function and a second function are mixed to obtain a transformation function according to the absolute value of the difference. Then, the transformation function is used to calculate an interpolation value of an interpolation point between the first point and the second point.

In one embodiment of the present invention, in the step of mixing the first function and the second function to obtain the transformation function according to the absolute value of the difference, a mixing weight of the first function and the second function is determined according to the absolute value of the difference, and the first function and the second function are mixed to obtain the transformation function by using the mixing weight.

In one embodiment of the present invention, in the step of mixing the first function and the second function to obtain the transformation function by using the mixing weight, the mixing weight m, the first function $f_1(x)$ and the second function $f_2(x)$ are used to calculate the transformation function $f(x)$ as:

$$f(x) = (1-m) \times f_1(x) + m \times f_2(x)$$

In one embodiment of the present invention, in the step of mixing the first function and the second function to obtain the transformation function by using the mixing weight, the absolute value of the difference is compared with a first threshold and a second threshold. When the absolute value of the difference is smaller than or equal to the first threshold, the first function is used as the transformation function. When the absolute value of the difference is larger than the second threshold, the second function is used as the transformation function. When the absolute value of the difference is larger than the first threshold and smaller than or equal to the second threshold, the first function and the second function are mixed to obtain the transformation function.

In one embodiment of the present invention, in the step of mixing the first function and the second function to obtain the transformation function according to the absolute value of the difference, a mixing weight of the first function and the second function is determined according to the absolute value of the difference, and the first function and the second function are mixed to obtain the transformation function by using the mixing weight.

In one embodiment of the present invention, in the step of calculating the interpolation value of the interpolation point between the first point and the second point by using the transformation function, a distance d between the interpolation point and the first point is substituted into the transformation function $f(x)$ to obtain an interpolation coefficient $f(d)$ of the interpolation point, and the interpolation coefficient ƒ(d), a value A of the first point and a value B of the second point are used to calculate the interpolation value Y of the interpolation point.

The present invention provides an interpolation circuit, which comprises an absolute value calculating unit, a transformation function calculating unit, and an interpolation value calculating unit. The absolute value calculating is used for calculating an absolute value of an difference between values of a first point and a second point. The transformation function calculating unit is used for mixing a first function and a second function to obtain a transformation function according to the absolute value of the difference calculated by the absolute value calculating unit. The interpolation value calculating unit is used for calculating the interpolation value of the interpolation point between the first point and the second point by using the transformation function obtained by the transformation function calculating unit.

In one embodiment of the present invention, the absolute value calculating unit comprises a difference calculating component and an absolute value calculating component. The difference calculating component is used for calculating a difference between the values of the first point and the second point. The absolute value calculating component is used for calculating the absolute value of the difference.

In one embodiment of the present invention, the transformation function calculating unit comprises a mixing weight calculating component and a function mixing component. The mixing weight calculating component is used for determining a mixing weight of the first function and the second function according to the absolute value of the difference calculated by the absolute value calculating unit. The function mixing component is used for mixing the first function and the second function to obtain the transformation function by using the mixing weight.

In one embodiment of the present invention, the function mixing component comprises using the mixing weight m, the first function $f_1(x)$ and the second function $f_2(x)$ to calculate the transformation function $f(x)$ as:

$$f(x)=(1-m)\times f_1(x)+m\times f_2(x)$$

In one embodiment of the present invention, the transformation function calculating unit further comprises a comparing component, which is used for comparing the absolute value of the difference with a first threshold and a second threshold. When the absolute value of the difference is smaller than or equal to the first threshold, the first function is used as the transformation function; when the absolute value of the difference is larger than the second threshold, the second function is used as the transformation function; and when the absolute value of the difference is larger than the first threshold and smaller than or equal to the second threshold, the first function and the second function are mixed to obtain the transformation function.

In one embodiment of the present invention, when the absolute value of the difference is larger than the first threshold and smaller than or equal to the second threshold, the transformation function calculating unit comprises using the mixing weight calculating component to determine a mixing weight of the first function and the second function according to the absolute value of the difference, and using the function mixing component to mix the first function and the second function to obtain the transformation function by using the mixing weight.

In one embodiment of the present invention, the interpolation value calculating unit comprises an interpolation coefficient calculating component and an interpolation value calculating component. The interpolation coefficient calculating component is used for substituting a distance d between the interpolation point and the first point into the transformation function $f(x)$ to obtain an interpolation coefficient $f(d)$ of the interpolation point. The interpolation value calculating component is used for calculating the interpolation value Y of the interpolation point by using the interpolation coefficient $f(d)$, a value A of the first point, and a value B of the second point.

In one embodiment of the present invention, the first point and the second point are pixels having corresponding location in adjacent two horizontal lines of an image, and the values of the first point and the second point are pixel values of the pixels.

In one embodiment of the present invention, the first function and the second function comprises a linear function and a sinusoidal function, or a combination thereof.

Based on the above, the interpolation method and the interpolation circuit of the present invention determines a weight to mix two functions according to the absolute value of the difference between two points and calculates the transformation function according to the weight. The original linear interpolation coefficient is then mapped to the transformation function and used to calculate the interpolation value between the two points, so as to obtain a result close to high order interpolation.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

For example.

DESCRIPTION OF EMBODIMENTS

The present invention determines a mixing weight of a linear function and a sinusoidal function according to an absolute value of a difference between two points, adjusts an original linear interpolation coefficient through the transformation function, and uses the adjusted linear interpolation coefficient to calculate an interpolation value, such that the present invention can achieve a result close to high order interpolation with limited hardware expense. Embodiments are given below for further illustrating detail steps of the interpolation method and functions of the interpolation circuit of the present invention.

Figure 1:
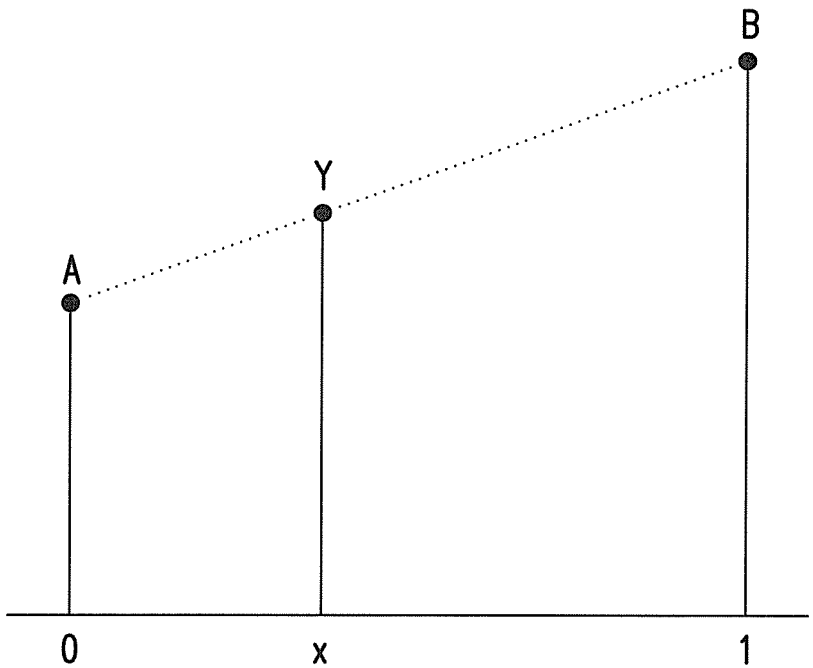
FIG. 1 is a schematic diagram illustrating a conventional linear interpolation method of two points.
Figure 2:
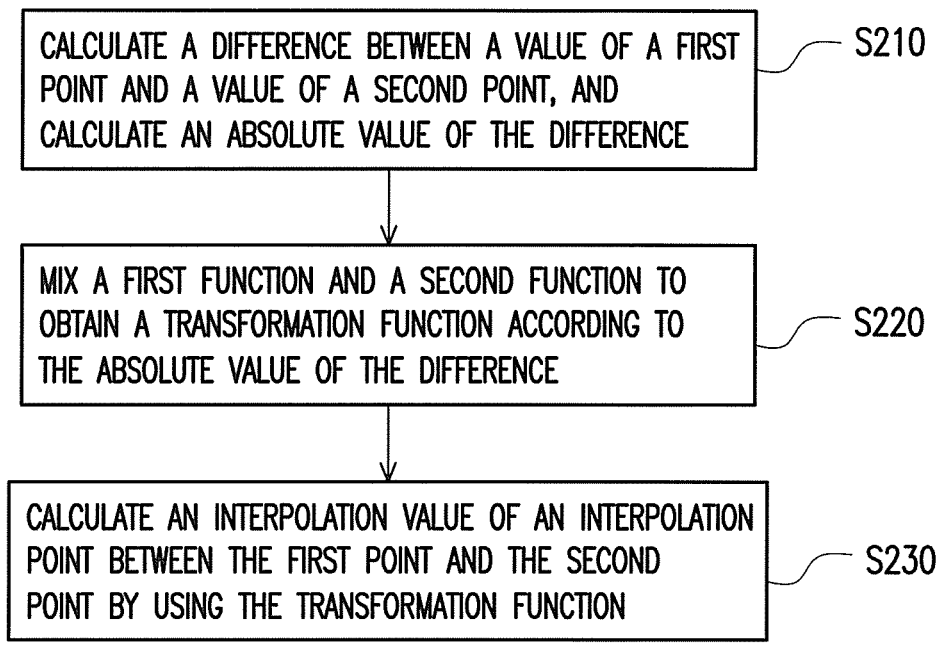
FIG. 2 is a flowchart illustrating an interpolation method according to an embodiment of the present invention.

FIG. 2 is a flowchart illustrating an interpolation method according to an embodiment of the present invention. Referring to FIG. 2, the present embodiment is suitable for calculating an interpolation value of an interpolation point between two points. Wherein, the present embodiment modifies the original interpolation formula (1) as:

$$Y=(1-f(x))\times A+f(x)\times B \qquad (2)$$

Wherein, A and B respectively represent pixel values of adjacent two pixels and Y represents the interpolation value of the interpolation point between these two pixels. To compare formula (1) with formula (2), the present embodiment substitutes a ratio x in the original interpolation formula (1) into a function $f(x)$. If a higher order function is used to be the function $f(x)$, then the interpolation value Y calculated by using the function $f(x)$ will be close to a result of high order interpolation.

It should be noted herein that the foregoing function $f(x)$ is obtained by mixing two functions with a specific weight, which is determined according to an absolute value of the difference between input two points. Accordingly, the interpolation method of the present embodiment calculates a difference between the values of adjacent first point and second point in the image and then calculates an absolute value of the difference (step S210).

Wherein, said first point and second point are, for example, pixels having corresponding location in adjacent two horizontal lines of the image, or adjacent pixels in same horizontal line of the image. That is to say, the first point and second point are adjacent pixels in a vertical direction or in a horizontal direction. In addition, the values of the first point and the second point are pixel values of these pixels.

After the absolute value of the difference is obtained, a first function and a second function are mixed to obtain a transformation function according to the absolute value of the difference (step S220). In detail, the present embodiment, for example, determines a mixing weight of the first function and the second function according to the absolute value of the difference first, and then uses the same to mix the first function and the second function, so as to obtain the transformation function. Wherein, the first function and the second function are, for example, a linear function, a sinusoidal function, or a combination thereof, which is not limited by the present embodiment.

Figure 3:
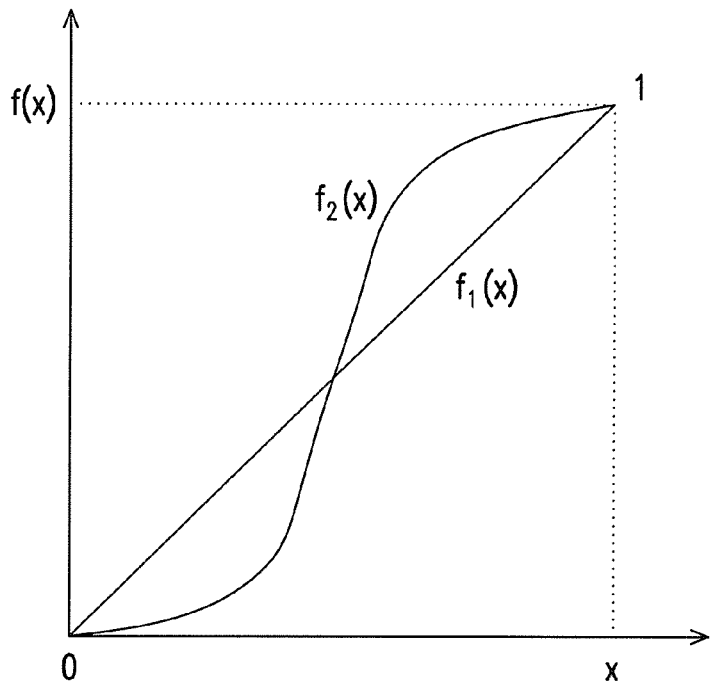
FIG. 3 is an example of calculating a transformation function by using a mixing weight.

For example, FIG. 3 is an example of calculating a transformation function by using a mixing weight. Referring to FIG. 3, the present embodiment assumes the mixing weight is m, a first function is $f_1(x)=x$, a second function is $f_2(x)=(1+\sin(\pi(x-\frac{1}{2})))/2$, and the calculation formula of the transformation function $f(x)$ is:

$$f(x)=(1-m)\times f_1(x)+m\times f_2(x) \qquad (3)$$

Wherein, the mixing weight m is determined according to an absolute value of the difference between the input two points.

After the transformation function is determined, the transformation function can be used to calculate an interpolation value of an interpolation point between the first point and the second point (step S230). In detail, by substituting a distance d between the interpolation point and the first point into the transformation function $f(x)$, an interpolation coefficient $f(d)$ of the interpolation point is obtained. Then, by substituting the interpolation coefficient $f(d)$ into formula (2), the interpolation value of the interpolation point between the first point and the second point can be obtained as:

$$Y=(1-f(d))\times A+f(d)\times B \qquad (4)$$

Wherein, A and B respectively represent pixel values of adjacent two pixels and Y represents the interpolation value of the interpolation point between these two pixels.

From the above, the method of the present embodiment can determine the transformation function only according to the absolute value of the difference between two points. If the transformation function is used to substitute for the original linear interpolation coefficient, then a result close to high order interpolation can be obtained. Therefore, the present embodiment may provide better interpolation result without increasing hardware expense.

It should be noted herein that beside the method of mixing two functions with the specific ratio, the present invention also divides the magnitude of the absolute value of the difference into three intervals, and uses different means to calculate the transformation function in each of the three intervals. Accordingly, the complexity of interpolation calculation can be simplified. An embodiment is given below for further illustration.

Figure 4:
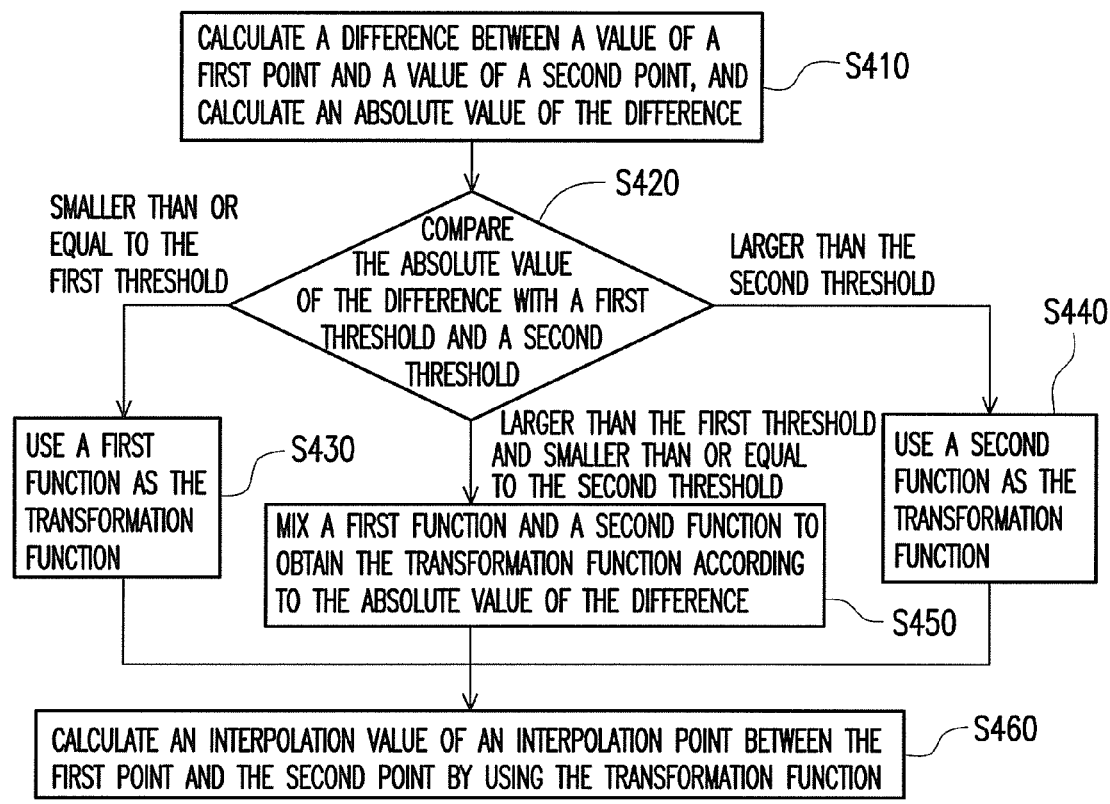
FIG. 4 is a flowchart illustrating an interpolation method according to an embodiment of the present invention.

FIG. 4 is a flowchart illustrating an interpolation method according to an embodiment of the present invention. Referring to FIG. 4, the present embodiment is suitable for calculating an interpolation value of an interpolation point between two points. The steps thereof are as follows.

First, a difference between the values of adjacent first point and second point in an image is calculated and an absolute value of the difference is further calculated (step S410). Wherein, said first point and second point are, for example, pixels having corresponding location in adjacent two horizontal lines of the image, or adjacent pixels in same horizontal line of the image, and the values of the first point and second point are pixel values of these pixels.

Next, a first function and a second function are mixed to obtain a transformation function according to the calculated absolute value of the difference. The interpolation method of the present embodiment compares the absolute value of the difference with a first threshold and a second threshold, so as to obtain a transformation function (step S420). Wherein, when the absolute value of the difference is smaller than or equal to the first threshold, then the first function is used as the transformation function (step S430); when the absolute value of the difference is larger than the second threshold, then the second function is used as the transformation function (step S440); and when the absolute value of the difference is larger than the first threshold and smaller than or equal to the second threshold, the first function and the second function are mixed according to the absolute value of the difference so as to obtain the transformation function (step S450). The first function is, for example, a linear function, and the second function is, for example, a sinusoidal function.

In detail, when the absolute value of the difference is relatively small, that is, the value of the first point is close to that of the second point, it is meaningless to use a high order function to calculate the interpolation value, such that the present embodiment skips the step of mixing functions and directly uses the linear function as the transformation function, so as to simplify the calculation; on the contrary, when the absolute value of the difference is relatively large, that is, the value of the first point is far from that of the second point, it is meaningless to use the linear function to calculate the interpolation value, such that the present embodiment also skips the step of mixing functions and directly uses the sinusoidal function as the transformation function; however, when the absolute value of the difference is between the foregoing two situations, the present embodiment uses the foregoing method of mixing the linear function and the sinusoidal function to obtain the transformation function, so as to provide a result close to high order interpolation without increasing hardware expense.

Figure 5:
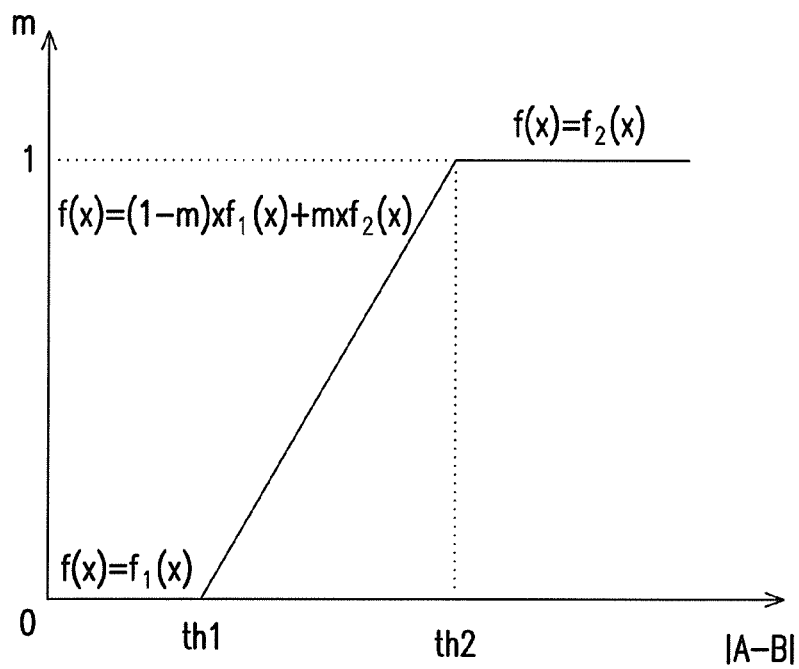
FIG. 5 is an example of determining a mixing weight according to the absolute value of the difference.

For example, FIG. 5 is an example of determining a mixing weight according to the absolute value of the difference. Referring to FIG. 5, a transverse axis represents the absolute value of the difference |A−B|, a vertical axis represents the mixing weight m, and th1 and th2 respectively represent the first threshold and the second threshold.

When the absolute value of the difference |A−B| is smaller than the first threshold th1, the mixing weight m is equal to 0. To substitute the mixing weight m into formula (3), a transformation function $f(x)$ can be obtained as $f_1(x)$.

When the absolute value of the difference |A−B| is larger than the first threshold th1 and smaller than or equal to the second threshold th2, then the mixing weight m is used to mix the first function $f_1(x)$ and the second function $f_2(x)$ to obtain the transformation function as:

$$f(x)=(1-m)\times f_1(x)+m\times f_2(x)$$

When the absolute value of the difference |A−B| is smaller than the first threshold th1, the mixing weight m is equal to 1. To substitute the mixing weight m into formula (3), a transformation function can be obtained as:

$$f(x)=f_2(x)$$

After the transformation function is determined, it can be used to calculate an interpolation value of an interpolation point between the first point and the second point (step S460). In detail, by substituting a distance d between the interpolation point and the first point into the transformation function $f(x)$, an interpolation coefficient $f(d)$ of the interpolation point can be obtained. Then, by substituting the interpolation coefficient $f(d)$ into formula (2), the interpolation value of the interpolation point between the first point and the second point can be obtained.

Figure 6:
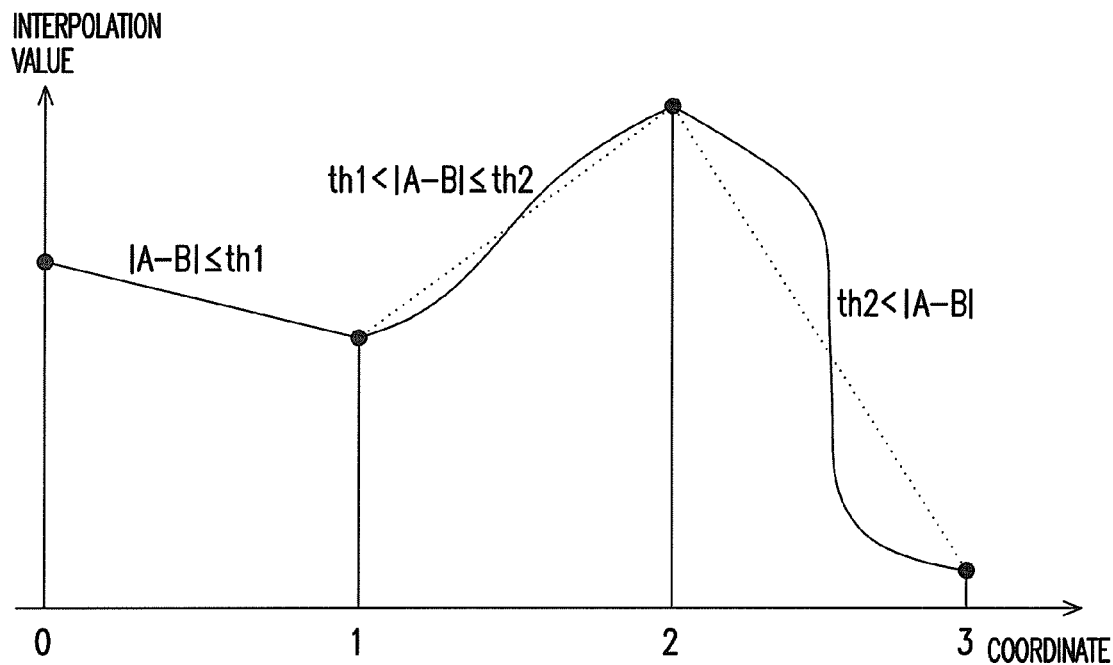
FIG. 6 is an example of calculating an interpolation value by using a transformation function.

For example, FIG. 6 is an example of calculating an interpolation value by using a transformation function. Referring to FIG. 6, the present embodiment is a result of the interpolation value calculated by using the transformation function of FIG. 5, in which the transverse axis represents coordinates of the interpolation point and the vertical axis represents the interpolation value of the interpolation point.

When the interpolation point is between the coordinates 0 and 1, due to the absolute value of the difference being smaller than th1, the interpolation coefficient x is not adjusted through the transformation function $f(x)$ and the method of linear interpolation still remains, such that the calculated curve of the interpolation value has a linear form.

When the interpolation point is between the coordinates 1 and 2, due to the absolute value of the difference being larger than th1 but smaller than or equal to th2, the transformation function $f(x)$ is adjusted to be between the first function $f_1(x)$ and the second function $f_2(x)$, such that the calculated curve of the interpolation value has a sinusoidal form.

When the interpolation point is between the coordinates 2 and 3, due to the absolute value of the difference being larger than th2, the transformation function $f(x)$ is adjusted to be the sinusoidal function $f_2(x)$, such that the calculated curve of the interpolation value has a sinusoidal form.

From the above, the method of the present embodiment determines to use the linear function, the sinusoidal function, or a combination thereof to be the transformation function according to the variation of the pixel values of adjacent two points, and uses the transformation function to substitute for the original linear interpolation coefficient. Therefore, the complexity of calculation can be simplified and a better interpolation result can be obtained.

In accordance with the foregoing interpolation method, the present invention also provided a corresponding interpolation circuit, so as to realize each step of the aforesaid interpolation method. An embodiment is given below for further illustration.

Figure 7:
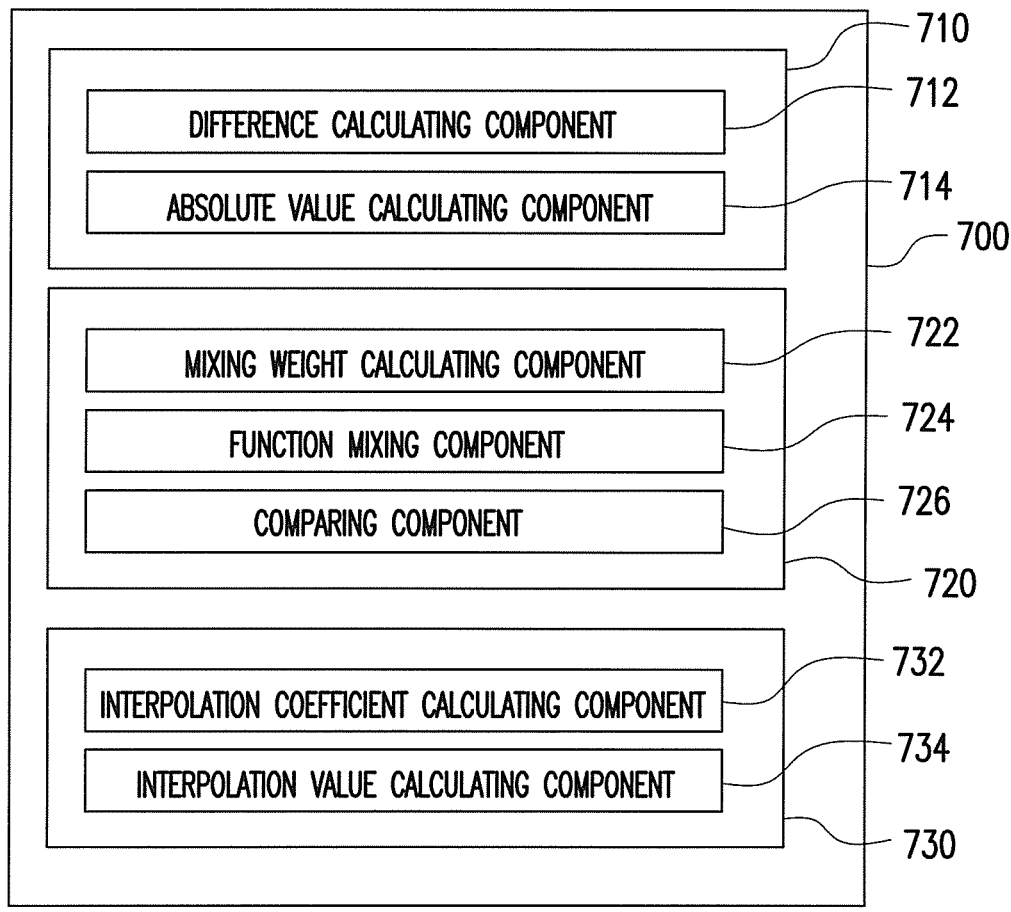
FIG. 7 is a block diagram of the interpolation circuit according to one embodiment of the present invention.

FIG. 7 is a block diagram of the interpolation circuit according to one embodiment of the present invention. Referring to FIG. 7, the interpolation circuit 700 of the present embodiment comprises an absolute value calculating unit 710, a transformation function calculating unit 720, and an interpolation value calculating unit 730, and the functions thereof are described respectively in the following.

The absolute value calculating unit 710 is used for calculating an absolute value of a difference between values of adjacent first point and second point. The absolute value calculating unit 710, for example, uses a difference calculating component 712 to calculate the difference between the values of the first point and the second point and then uses an absolute value calculating component 714 to calculate the absolute value of the difference. Wherein, said first point and second point are, for example, pixels having corresponding location in adjacent two horizontal lines of the image, or adjacent pixels in same horizontal line of the image, and the values of the first point and second point are pixel values of these pixels.

The transformation function calculating unit 720 is used for mixing a first function and a second function to obtain a transformation function according to the absolute value of the difference calculated by the absolute value calculating unit 710. The transformation function calculating unit 720, for example, uses a mixing weight calculating component 722 to determine a mixing weight of the first function and the second function according to the absolute value of the difference calculated by the absolute value calculating unit 710 and uses function mixing component 724 to mix the first function and the second function to obtain the transformation function by using the mixing weight. Wherein, the method for calculating the transformation function has been described in the foregoing embodiment, so the related content is omitted herein.

It should be noted herein that the transformation function calculating unit 720 further comprises a comparing component 726, which is used for comparing the absolute value of the difference with a first threshold and a second threshold. Wherein, when the comparing component 726 determines that the absolute value of the difference is smaller than or equal to the first threshold, then transformation function calculating unit 720 uses the first function as the transformation function (step S430); when the comparing component 726 determines that the absolute value of the difference is larger than the second threshold, then transformation function calculating unit 720 uses the second function as the transformation function (step S440); and when the comparing component 726 determines that the absolute value of the difference is larger than the first threshold and smaller than or equal to the second threshold, then the transformation function calculating unit 720 mixes the first function and the second function to obtain the transformation function according to the absolute value of the difference.

The interpolation value calculating unit 730 uses the transformation function calculated by the transformation function calculating unit 720 to calculate an interpolation value of an interpolation point between the first point and the second point. In detail, the interpolation value calculating unit 730 uses an interpolation coefficient calculating component 732 to substitute a distance d between the interpolation point and the first point into the transformation function $f(x)$, so as to obtain the interpolation coefficient $f(d)$ of the interpolation point. Next, the interpolation value calculating unit 730 uses an interpolation value calculating component 734 to calculate the interpolation value Y of the interpolation point according to the interpolation coefficient $f(d)$, a value A of the first point, and a value B of the second point. Wherein, the method for calculating the interpolation value has been described in the foregoing embodiment, so the related content is omitted herein.

In summary, when an image processing device or software performs an image magnifying function, it can store the horizontal lines of the image into a line buffer, so as to execute interpolation value calculation between each two pixels. Wherein, for the interpolation value in a horizontal direction, the device may calculate through interpolation of pixels in the same horizontal line, but for the interpolation value in a vertical direction, the device has to calculate through interpolation of corresponding pixels in adjacent horizontal lines. However, through the interpolation method and the interpolation circuit of the present invention, only pixel values of a current pixel and a corresponding pixel in a previous horizontal line are referenced, and then the interpolation coefficient can be adjusted by the absolute value of the difference between the two pixels. Therefore, the present invention can achieve a result close to high order interpolation by using only one line buffer.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An interpolation method, suitable for calculating an interpolation value of an interpolation point between two points of an image, the interpolation method performed by a processor of an image processing device comprising:
   calculating a difference between pixel values of a first point and a second point of the image by the processor;
   determining a mixing weight of a first function and a second function according to an absolute value of the difference by the processor;
   mixing a first function and a second function according to the mixing weight to obtain a transformation function $f(x)$ by the processor;
   substituting a distance d between the interpolation point and the first point into the transformation function $f(x)$ to obtain an interpolation coefficient $f(d)$ of the interpolation point by the processor; and
   calculating the interpolation value of the interpolation point between the first point and the second point by using the interpolation coefficient $f(d)$ and the pixel values of the first point and the second point by the processor.

2. The interpolation method according to claim 1, wherein the step of mixing the first function and the second function by using the mixing weight to obtain the transformation function comprises:
   using the mixing weight m, the first function $f_1(x)$, and the second function $f_2(x)$ to calculate the transformation function $f(x)$ as:

$$f(x)=(1-m)\times f_1(x)+m\times f_2(x).$$

3. The interpolation method according to claim 1, wherein determining the mixing weight of the first function and the second function and mixing the first function and the second function by using the mixing weight to obtain the transformation function comprises:
   comparing the absolute value of the difference with a first threshold and a second threshold;
   using the first function as the transformation function when the absolute value of the difference is smaller than or equal to the first threshold;
   using the second function as the transformation function when the absolute value of the difference is larger than the second threshold; and
   mixing the first function and the second function to obtain the transformation function when the absolute value of the difference is larger than the first threshold and smaller than or equal to the second threshold.

4. The interpolation method according to claim 1, wherein the first point and the second point are pixels having corresponding location in adjacent two horizontal lines of the image.

5. The interpolation method according to claim 1, wherein the first function and the second function comprises a linear function and a sinusoidal function, or a combination thereof.

6. An interpolation circuit in an image processing device, the interpolation circuit comprising:
   an absolute value calculating circuitry, for calculating an absolute value of an difference between pixel values of a first point and a second point of an image;
   a transformation function calculating circuitry, for determining a mixing weight of a first function and a second function according to the absolute value of the difference calculated by the absolute value calculating circuitry and for mixing a first function and a second function $f(x)$ according to the mixing weight to obtain a transformation function; and
   an interpolation value calculating circuitry, for substituting a distance d between the interpolation point and the first point into the transformation function $f(x)$ to obtain an interpolation coefficient $f(d)$ of the interpolation point and for further calculating an interpolation value of an interpolation point between the first point and the second point by using the interpolation coefficient $f(d)$ and the pixel values of the first point and the second point.

7. The interpolation circuit according to claim 6, wherein the absolute value calculating circuitry comprises:
   a difference calculating component, for calculating the difference between the values of the first point and the second point; and
   an absolute value calculating component, for calculating the absolute value of the difference.

8. The interpolation circuit according to claim 6, wherein the transformation function calculating circuitry comprises:
   a mixing weight calculating component, for determining the mixing weight of the first function and the second function according to the absolute value of the difference calculated by the absolute value calculating circuitry; and
   a function mixing component, for mixing the first function and the second function to obtain the transformation function by using the mixing weight.

9. The interpolation circuit according to claim 8, wherein the function mixing component comprises using the mixing weight m, the first function $f_1(x)$, and the second function $f_2(x)$ to calculate the transformation function $f(x)$ as:

$$f(x)=(1-m)\times f_1(x)+m\times f_2(x).$$

10. The interpolation circuit according to claim 8, wherein the transformation function calculating circuitry further comprises:

a comparing component, for comparing the absolute value of the difference with a first threshold and a second threshold, wherein when the absolute value of the difference is smaller than or equal to the first threshold, the first function is used as the transformation function;

when the absolute value of the difference is larger than the second threshold, the second function is used as the transformation function; and when the absolute value of the difference is larger than the first threshold and smaller than or equal to the second threshold, the first function and the second function are mixed to obtain the transformation function.

11. The interpolation circuit according to claim 10, wherein when the absolute value of the difference is larger than the first threshold and smaller than or equal to the second threshold, the transformation function calculating circuitry comprises using the mixing weight calculating component to determine the mixing weight of the first function and the second function according to the absolute value of the difference, and using the function mixing component to mix the first function and the second function to obtain the transformation function by using the mixing weight.

12. The interpolation circuit according to claim 6, wherein the interpolation value calculating circuitry comprises:

an interpolation coefficient calculating component, for substituting the distance d between the interpolation point and the first point into the transformation function $f(x)$ to obtain the interpolation coefficient $f(d)$ of the interpolation point; and an interpolation value calculating component, for calculating the interpolation value Y of the interpolation point by using the interpolation coefficient $f(d)$, the pixel value A of the first point, and the pixel value B of the second point.

13. The interpolation circuit according to claim 6, wherein the first point and the second point are pixels having corresponding location in adjacent two horizontal lines of an image, and the pixel values of the first point and the second point are pixel values of the pixels.

14. The interpolation circuit according to claim 6, wherein the first function and the second function comprises a linear function and a sinusoidal function, or a combination thereof.

* * * * *